United States Patent
Kido et al.

(10) Patent No.: US 7,673,331 B2
(45) Date of Patent: Mar. 2, 2010

(54) SERVER CERTIFICATE ISSUING SYSTEM

(75) Inventors: Keisuke Kido, Tokyo (JP); Ichiro Chujo, Tokyo (JP)

(73) Assignee: Globalsign K.K., Tokyo (JP)

( * ) Notice: Subject to any disclaimer, the term of this patent is extended or adjusted under 35 U.S.C. 154(b) by 0 days.

(21) Appl. No.: 12/187,973

(22) Filed: Aug. 7, 2008

(65) Prior Publication Data

US 2009/0092247 A1      Apr. 9, 2009

(30) Foreign Application Priority Data

Oct. 5, 2007     (JP) .............................. 2007-262485

(51) Int. Cl.
*G06F 7/04* (2006.01)

(52) U.S. Cl. ................ 726/7; 726/6; 713/155

(58) Field of Classification Search ........................ None
See application file for complete search history.

(56) References Cited

U.S. PATENT DOCUMENTS

| | | | | |
|---|---|---|---|---|
| 6,959,382 | B1 * | 10/2005 | Kinnis et al. ................ | 713/170 |
| 2002/0059364 | A1 * | 5/2002 | Coulthard et al. ........... | 709/203 |
| 2003/0126431 | A1 * | 7/2003 | Beattie et al. ................ | 713/156 |
| 2004/0015699 | A1 * | 1/2004 | Thomas et al. .............. | 713/179 |
| 2005/0071630 | A1 * | 3/2005 | Thornton et al. ............ | 713/156 |
| 2005/0076203 | A1 * | 4/2005 | Thornton et al. ............ | 713/156 |
| 2005/0081026 | A1 * | 4/2005 | Thornton et al. ............ | 713/156 |
| 2005/0289084 | A1 * | 12/2005 | Thayer et al. ................. | 705/67 |
| 2006/0053483 | A1 * | 3/2006 | Beattie et al. .................. | 726/5 |
| 2006/0143442 | A1 * | 6/2006 | Smith ........................ | 713/156 |
| 2006/0167765 | A1 * | 7/2006 | Lacey et al. .................... | 705/26 |
| 2008/0082354 | A1 * | 4/2008 | Hurry et al. .................... | 705/1 |

FOREIGN PATENT DOCUMENTS

| | | |
|---|---|---|
| JP | 2001-249612 | 9/2001 |
| JP | 2002-032532 | 1/2002 |
| JP | 2003-244137 | 8/2003 |
| JP | 2004-007512 | 1/2004 |

(Continued)

OTHER PUBLICATIONS

Tanaka, Brian, "Acquiring and Installing a Server Certificate", Apr. 1998, Sys Admin Magazine, 9 pages.*

*Primary Examiner*—William R Korzuch
*Assistant Examiner*—Michael R Vaughan
(74) *Attorney, Agent, or Firm*—Carrier, Blackman & Associates, P.C.; Joseph P. Carrier; William D. Blackman

(57) ABSTRACT

A server certificate issuing system confirms existence of a Web server for which a certificate is to be issued. The web server includes means for generating an entry screen to input application matters for an issuance of a server certificate, means for generating a key pair a public key and a private key, means for generating a certificate signing request file (CSR) containing the generated public key, and means for generating a verification page indicating intention of requesting the issuance of the certificate. A registration server retrieves the CSR from a received server certificate request and accesses the Web server to read the verification information, and compares the read verification information with the CSR. If the verification information read from the Web server is identical to the CSR, it is determined that the Web server for which the server certificate is to be issued exists.

12 Claims, 7 Drawing Sheets

FOREIGN PATENT DOCUMENTS

| | | |
|---|---|---|
| JP | 2005-010301 | 1/2005 |
| JP | 2005-333596 | 2/2005 |
| JP | 2005-506737 | 3/2005 |
| JP | 2006-023885 | 1/2006 |
| JP | 2007-013597 | 1/2007 |

* cited by examiner

SERVER CERTIFICATE ISSUING SYSTEM

CROSS-REFERENCE TO RELATED APPLICATIONS

The present application claims priority under 35 USC §119 based on Japanese patent application No. 2007-262485, filed on Oct. 5, 2007. The entire subject matter of this priority document is incorporated by reference herein.

BACKGROUND OF THE INVENTION

1. Field of the Invention

The present invention relates to a server certificate issuing system which issues a server certificate in response to a server certificate request transmitted from a Web server.

2. Description of the Related Art

In order to securely perform Internet communications between a Web server and a Web browser, SSL (Secure Socket Layer) using PKI (Public Key Infrastructure) has been put to practical use. In a communication system in which the SSL has been introduced, since an encryption process is performed by using a server certificate (SSL certificate) issued by a certificate authority (CA) which is a trusted third-party authority, spoofing, tamper, sniffing and the like are prevented and more secure Internet communications are assured.

When the certificate authority issues the server certificate, identification of a person requesting the issuance of the server certificate is important. As an identification method, a server certificate issuing system using domain authentication has been put to practical use (for example, see Japanese Patent Laid-Open No. 2005-506737). In this known identification method, when the issuance of a server certificate is requested, a registration server accesses a database of a domain registration server (Whois information) to contact an approver having an authority to approve the issuance of the server certificate for the above described Web server. Using communicating means such as telephone, e-mails or the like, whether or not the certificate request is approved is verified, and only if the approval from the approver is obtained, the certificate is issued.

Moreover, in the conventional server certificate issuing system, when an application for the issuance of the certificate is made, an applicant generates a PKI key pair, and generates a Certificate Signing Request file (CSR) to make the application for the issuance of the certificate to the registration server.

In the conventional identification method using the domain authentication, a person having the authority to approve the issuance of the certificate is searched based on the Whois information, and the identification is performed based on the approval from the searched approver. However, in an authentication method of an Approver-Email system, merely the approval from the person having the authority to approve is obtained and existence of the Web server for which the certificate is to be issued is not confirmed, which has caused a security problem. Moreover, the identification with the e-mail has a potential risk of causing a security problem in the case where the e-mail has been sniffed or the like. Furthermore, since a registration authority has to access the database of the domain registration server to search the approver, there has been also a disadvantage of a complicated identification task in the registration authority. In addition, confirmation of the approval has to be obtained with the communicating means such as the telephone, which has become a major impediment to automation of the issuance of the certificate.

Furthermore, in the conventional certificate issuing system, a user has to generate the key pair to generate the CSR, which has also been pointed out as a disadvantage of a large procedural burden on the user.

SUMMARY OF THE INVENTION

It is an object of the present invention to realize a server certificate issuing system in which existence of a Web server for which a certificate is to be issued can be confirmed and security is further improved.

It is another object of the present invention to realize a server certificate issuing system in which a procedural burden on an applicant is significantly reduced.

Furthermore, it is another object of the present invention to realize a server certificate issuing system in which an issuance of a server certificate can be full-automatically performed.

A server certificate issuing system according to the present invention is a server certificate issuing system including a registration server provided in a registration authority to receive a server certificate request transmitted from a Web server via a network and to transmit a certificate signing request file (CSR) which is included in the server certificate request to an issuing authority after performing a predetermined examination, and a certificate issuing server provided in the issuing authority to receive the CSR transmitted from the registration server, to generate a server certificate with a digital signature, and to transmit the generated server certificate to the registration server, wherein the Web server includes means for generating an entry screen to input application information for the server certificate, means for generating a key pair of a public key and a private key, means for generating the CSR containing the generated public key, verification page generating means for generating a verification page to indicate intention of requesting an issuance of the certificate and storing verification information in the above described verification page, means for generating the server certificate request containing the application information including at least address information on the above described Web server and the generated CSR, and means for transmitting the generated server certificate request to the registration server in the registration authority, and the registration server includes means for receiving the server certificate request transmitted from the Web server, means for assigning an order ID to the received server certificate request, storage means for storing the server certificate request assigned with the order ID, means for accessing the verification page of the Web server based on the address information contained in the received server certificate request to read out the verification information indicated on the verification page, verification means for verifying whether the verification page has been generated or not by comparing the read verification information with the application information contained in the server certificate request, and means for transmitting the CSR contained in the received server certificate request to the certificate issuing server, and wherein the registration server transmits the CSR contained in the server certificate request to the certificate issuing server only when the verification means has judged that the verification page has been generated, as the result of the verification.

According to the present invention, the registration server provided in the registration authority accesses the verification page identified by the address information contained in an application for the issuance of the certificate, to verify whether the verification page has been generated on the Web server or not. Therefore, the existence of the Web server for which the certificate is to be issued is confirmed, and the intention of requesting the issuance of the server certificate, that is, an authority of an identical person to manage the Web server is also confirmed. As a result, identification with higher security than the conventional domain authentication is performed. Furthermore, when the verification page is verified, the verification information indicated on the verification page is read out, and the read verification information is compared with the application information contained in the server certificate request. Therefore, authenticity of the verification page is also confirmed and thereby the identification with the higher security is performed.

The verification page can have a part of CSR data, for example, last 10 characters thereof as a resource file name of the verification page, and contents of the verification page can be, for example, the CSR data. After generating the verification page based on the CSR data, the Web server can include URL information of the verification page in the certificate request and transmit the server certificate request to the registration server.

It should be noted that, on the Web server side, directory information can be configured not to be displayed, or it is also possible to place a blank index.html file in a directory of the verification page so that index information cannot be viewed from outside.

The verification of the page by the registration server starts with retrieving the URL information (resource file name of the verification page) on the verification page contained in the certificate request. A URL containing an FQDN (Fully Qualified Domain Name: a common name of the server) and resource file name of the verification page is generated and the verification page is read with an http protocol. The existence of the page is confirmed by reading the verification page, and the authenticity of the verification page is confirmed by comparing displayed contents of the verification page with the application information contained in the server certificate request.

In a preferred embodiment of the server certificate issuing system according to the present invention, the CSR contained in the server certificate request is used as the verification information, the verification page generating means of the above described Web server displays the generated CSR on the verification page, and the above described verification means of the registration server verifies whether the verification page has been generated or not by comparing the verification information read out from the verification page with the CSR contained in the application information for the issuance of the server certificate. The CSR is unique encrypted data included in the server certificate request and transmitted to the registration server, and has been highly encrypted. Therefore, the CSR has a very small risk of being sniffed and decrypted by a third party. Therefore, from the perspective of assuring the security, it is highly effective to use the CSR as the verification information.

In another preferred embodiment of the server certificate issuing system according to the present invention, the verification page generating means of the Web server performs an encryption operation for a part of the application information contained in the server certificate request using a predetermined encrypting arithmetic expression and displays the obtained encrypted data as the verification information on the verification page, and the above described verification means of the registration server performs an encryption operation for a part of the information contained in the received application information for the server certificate using the above described predetermined encrypting arithmetic expression to verify whether the verification page has been generated or not by comparing the generated encrypted data with the verification information read out from the verification page. For example, it is possible to use the FQDN of the above described Web server and a date as a part of the application information, and encrypt them using the generated public key to generate the encrypted data. Since the FQDN of the Web server and the date as well as the public key are contained in the server certificate request and transmitted from the Web server to the registration server, the registration server and the Web server have common information and a common encryption key. Therefore, similarly to the case of using the public key to use the CSR as the verification information, a high security environment can be assured.

Furthermore, as another method of generating the verification page, the generation of the verification page with a predetermined rule or encrypting arithmetic expression has also a similar effect, instead of generating the verification page from the CSR. For example, information which is uniquely determined from the certificate request, such as the FQDN (the common name of the server), the certificate order ID, a user ID and an application date, is combined, and data hashed by the encryption operation (for example, a hash function SHA-1) is generated as the contents of the verification page. After generating the verification page, the Web server includes the URL information (resource file name) of the verification page in the certificate request, transmits it, and notifies the registration server of it.

The registration server retrieves the URL information (resource file name) of the verification page contained in the certificate request, generates the URL containing the FQDN (the common name of the server), and reads the verification page with the http protocol. The existence of the page is confirmed by reading the verification page. The authenticity of the verification page is confirmed by verifying an exact data match between the contents of the verification page and an operation result calculated by the predetermined rule or encrypting arithmetic expression, for example, an operation result of hashing the FQDN (the common name of the server), the certificate order ID, the user ID and the application date by the hash function SHA-1.

In a preferred embodiment of the server certificate issuing system according to the present invention, the Web server has status inquiry means for inquiring of the registration server as to an issuance status of the certificate, and performs the status inquiry periodically to the registration server, using the above described order ID as a key. The Web server and the registration server are coupled by a SOAP interface with a pair of a request and a response, and the security is assured by encrypted communications and robust authentication with SSL communications. A result of verifying the verification page is immediately returned to the Web server as a response to the certificate request. Input errors in the FQDN and the like are notified at the time of the application.

In another preferred embodiment of the server certificate issuing system according to the present invention, the Web server has a control panel to mainly configure and manage the Web and a mail, and the means for generating the entry screen to input the above described application information for the issuance of the server certificate, the means for generating the key pair of the public key and the private key, the means for generating the CSR, the means for generating the verification page, the means for generating the server certificate request, and the status inquiry means are incorporated into the control panel.

In the present invention, the issuance and management of the server certificate can be performed under the control of the control panel provided in the Web server to mainly configure and manage the Web and the mail. Particularly, since the means for generating the entry screen to input the application information for the issuance of the server certificate, the means for generating the key pair of the public key and the private key, the means for generating the CSR, the means for generating the verification page, the means for generating the server certificate request, and the status inquiry means are incorporated into the control panel used in the present invention, processes from (1) the application for the issuance of the server certificate to (2) the installation of the issued server certificate can be automatically executed in series by utilizing these means.

In another preferred embodiment of the server certificate issuing system according to the present invention, the registration server further includes means for receiving the server certificate transmitted from the certificate issuing server, means for storing the received server certificate in a download area, means for responding to the certificate status inquiry transmitted from the above described Web server, and download means for downloading the server certificate stored in the download area to the Web server, and when the above described registration server receives the certificate status inquiry from the Web server, if a corresponding server certificate is stored in the download area, as a response to the above described status inquiry, the server certificate stored in the download area is downloaded to the Web server, and wherein the processes from (1) the application for the issuance of the server certificate to (2) the downloading of the issued server certificate to the Web server are automatically executed in series.

In the present invention, the server certificate request transmitted from the Web server to the registration server can contain the FQDN of the Web server, an e-mail address of an administrator managing the Web server, a certificate validity start date and a certificate validity period, in addition to the CSR and the address information.

According to the present invention, when the registration server has received the server certificate request, the registration sever accesses the Web server identified by the FQDN to read out the verification information indicated on the verification page, and determines the authenticity of the verification page by comparing the read verification information with the application information contained in the server certificate request. Thereby, the existence of the Web server for which the server certificate is to be issued is confirmed, and the intention of the server administrator to request the issuance of the server certificate is also confirmed. As a result, the higher security than the conventional domain authentication method is assured.

Furthermore, it is possible to execute the processes from (1) the application for the issuance of the server certificate to (2) the installation of the issued server certificate as an automated series of processes by loading a server certificate issuing program on the control panel provided in the Web server.

DETAILED DESCRIPTION OF THE PREFERRED EMBODIMENTS

Figure 1:
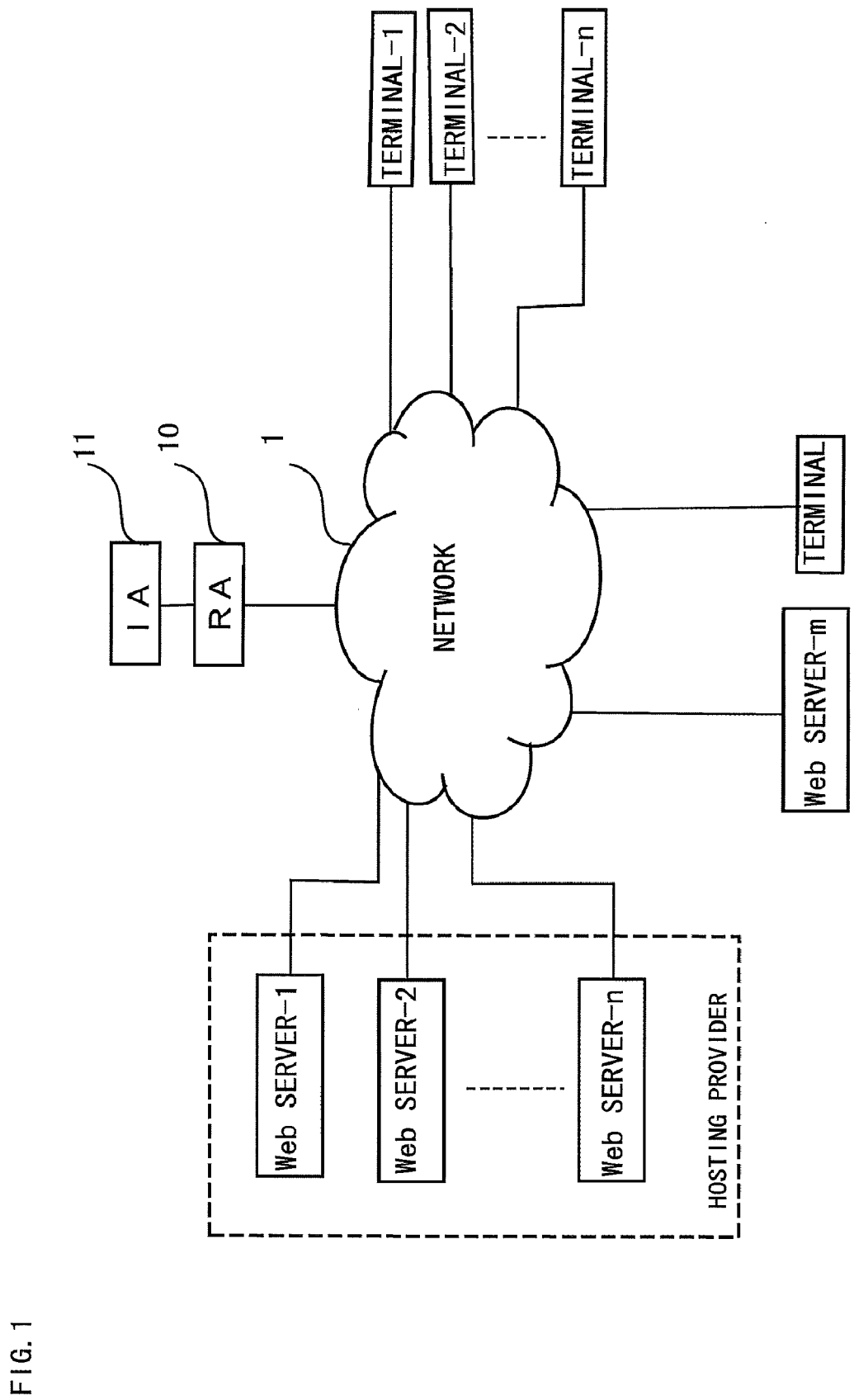
FIG. 1 is a diagram showing an overall configuration of a server certificate issuing system according to the present invention.

FIG. 1 is a diagram showing an overall configuration of a server certificate issuing system according to the present invention. To a network 1, n Web servers 1 to n under the control of a hosting provider are connected, and another Web server m owned by a person other than the hosting provider is also connected. The Web servers 1 to n under the control of the hosting provider are managed via the network 1 and respective terminals 1 to n by server administrators having management authorities for the respective Web servers, respectively. Moreover, the Web server m is managed via the network 1 and another terminal m by an administrator of the above described server. Furthermore, a registration server 10 provided in a registration authority which accepts a server certificate request is connected to the network 1. Furthermore, the registration server 10 is connected to a certificate issuing server 11 provided in an issuing authority (IA) via the network. The certificate issuing server 11 receives a CSR transmitted from the registration server 10, and provides a signature to issue a server certificate.

In this example, it is assumed that functions from the server certificate request to downloading of the issued certificate are incorporated into a control panel. In each Web server, the control panel for mainly configuring and managing the Web and the mail is incorporated, and an issuance and management of an SSL certificate are performed under the control of the control panel in this example. For example, if the administrator of the Web server 1 desires the issuance of the server certificate, the above described administrator accesses the Web server 1 managed by him/her via the terminal 1 and the network to display a menu of the control panel. Then, the administrator clicks on a menu "Issuance of SSL Certificate" in the displayed menu. When the menu "Issuance of SSL Certificate" is clicked, the control panel displays an entry screen to input application information for the server certificate. The application information for the issuance of the server certificate includes at least the following information:
a common name (FQDN: Fully Qualified Domain Name) or an IP address of the Web server;
a name and an e-mail address of an application administrator; and
a validity start date and a validity period of the certificate.

When necessary application information has been completely inputted, the control panel determines that the server certificate request has been made, and generates a Certificate Signing Request file (CSR) in response to this certificate request. The server certificate request containing the CSR file is transmitted to the registration server 10 via the network, and an examination including identification is performed in the registration server. If the certificate request satisfies a predetermined requirement, the registration server 10 transmits the CSR file to the certificate issuing server 11 provided in the issuing authority, and the certificate issuing server provides a digital signature to generate the server certificate. The generated server certificate is transmitted to the registration server 10 and stored in a download area, and the registration server notifies the Web server 1 of completion of the downloading. When receiving the download notification, the control panel of the Web server 1 transmits a download request to the registration server and installs the downloaded server certificate therein. In other words, in this example, after the certificate request is inputted by the administrator of the Web server, processes from (1) the application for the issuance of the certificate to (2) the installation of the server certificate are executed in series under the control of the control panel incorporated into the Web server. Therefore, the sequential processes of issuing the server certificate are automated and a burden on a user is significantly reduced.

Figure 2:
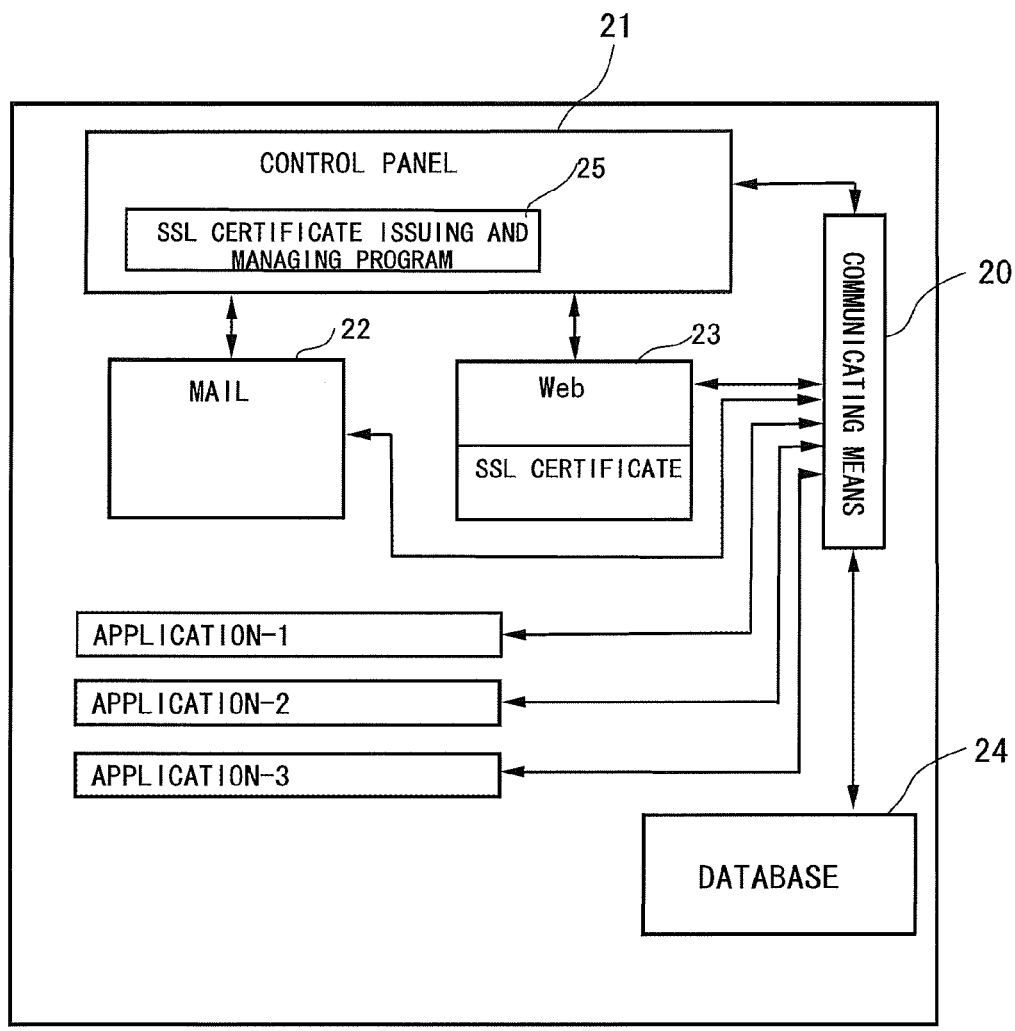
FIG. 2 is a diagram showing an example of a Web server according to the present invention.

FIG. 2 is a diagram showing a configuration of an example of the Web server according to the present invention. The Web server has communicating means 20, and communicates with a user terminal via the communicating means 20. Furthermore, the Web server has a control panel 21, and the mail and the Web are configured and managed by the control panel 21. Therefore, a mail function section 22 and a Web function section 23 are configured and managed by the control panel 21. The Web function section 23 is provided with an SSL certificate control function section, and includes functions of the installation of the certificate and https protocol control based on the certificate, and in addition, typically, a function of generating a PKI key pair and the CSR. In the Web server, applications 1 to 3 are incorporated and also a database 24 is incorporated.

The control panel 21 is provided with an SSL certificate issuing and managing program 25, and under the control of this SSL certificate issuing and managing program 25, the processes from (1) the application for the issuance of the server certificate to (2) the installation of the issued server certificate are executed in series.

Figure 3:
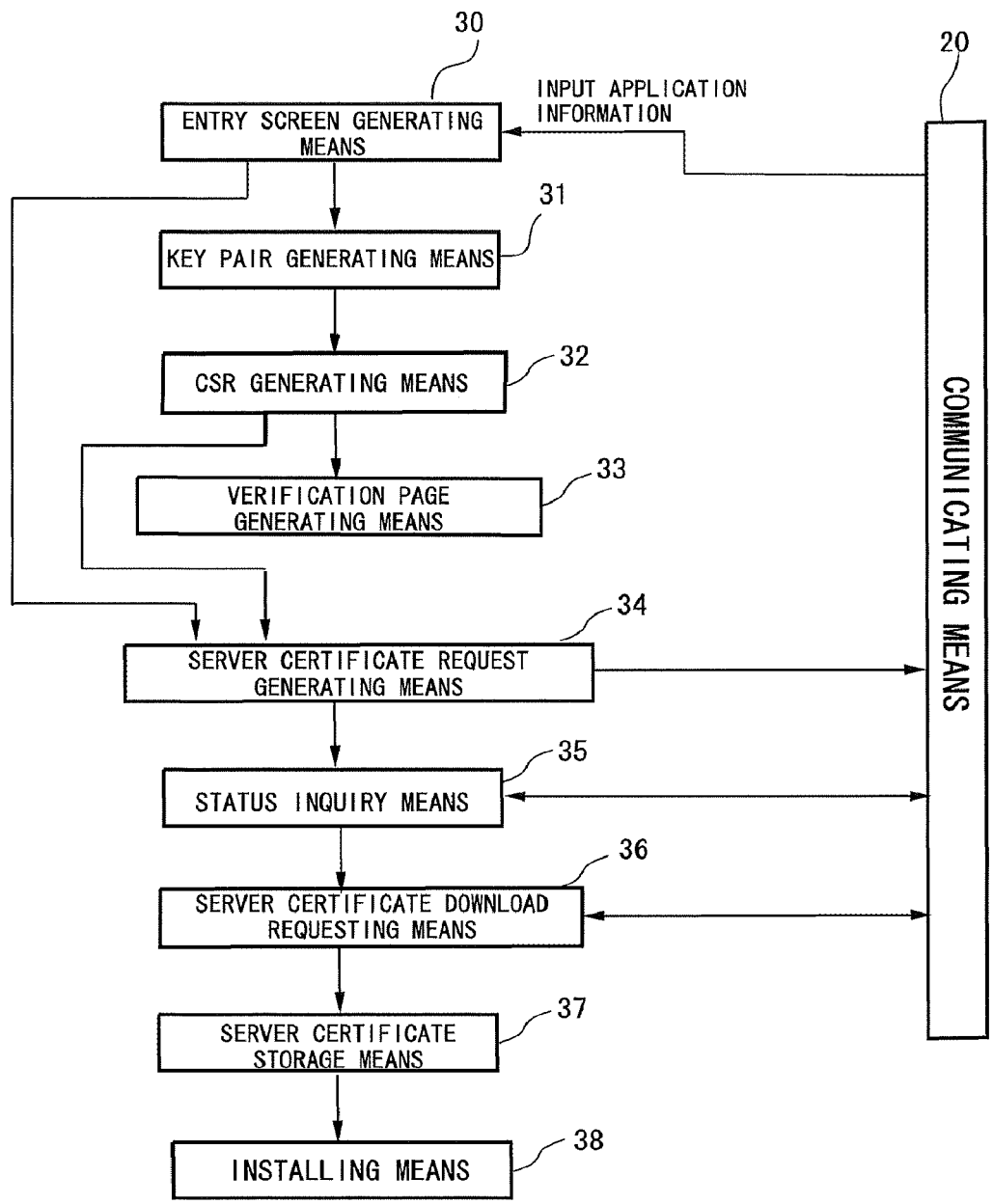
FIG. 3 is a diagram showing an example of an SSL certificate issuing and managing program incorporated into the Web server.

FIG. 3 is a diagram showing functions of the SSL certificate issuing and managing program 25 of the control panel 21. In this example, the CSR is used as verification information for the identification. When the administrator of the Web server accesses the Web server for issuing the certificate, entry screen generating means 30 is started, and the entry screen to input the application information required for issuing the certificate is displayed on a monitor. When the server administrator has completely inputted the application information, key pair generating means 31 operates to generate a key pair of a public key and a private key. Next, CSR generating means 32 operates and the CSR file containing the public key is generated. Furthermore, verification page generating means 33 operates to generate a verification page to indicate intention of the application for the issuance of the certificate, and displays the generated CSR as the verification information. The information contained in the application information, such as the common name (FQDN: Fully Qualified Domain Name) of the Web server, the name and the e-mail address of the application administrator, and the validity start date and the validity period of the certificate, is transmitted along with the generated CSR to server certificate request generating means 34. Then in the server certificate request generating means 34, the server certificate request is generated and transmitted to the registration server 10 provided in the registration authority, via the communicating means 20 and the network 1. It should be noted that a URL of the verification page is generated on the registration server side in this example.

The SSL certificate issuing and managing program has status inquiry means 35 for inquiring of the registration server as to an issuance status of the certificate. After transmitting the server certificate request, the SSL certificate issuing and managing program periodically inquires of the registration server 10 as to the issuance status of the certificate, and also receives a response from the registration server. Furthermore, the SSL certificate issuing and managing program has server certificate download requesting means 36 to transmit the download request to the registration server when the download notification has been transmitted from the registration server. The downloaded server certificate is stored in server certificate storage means 37, and installed by installing means 38.

Figure 4:
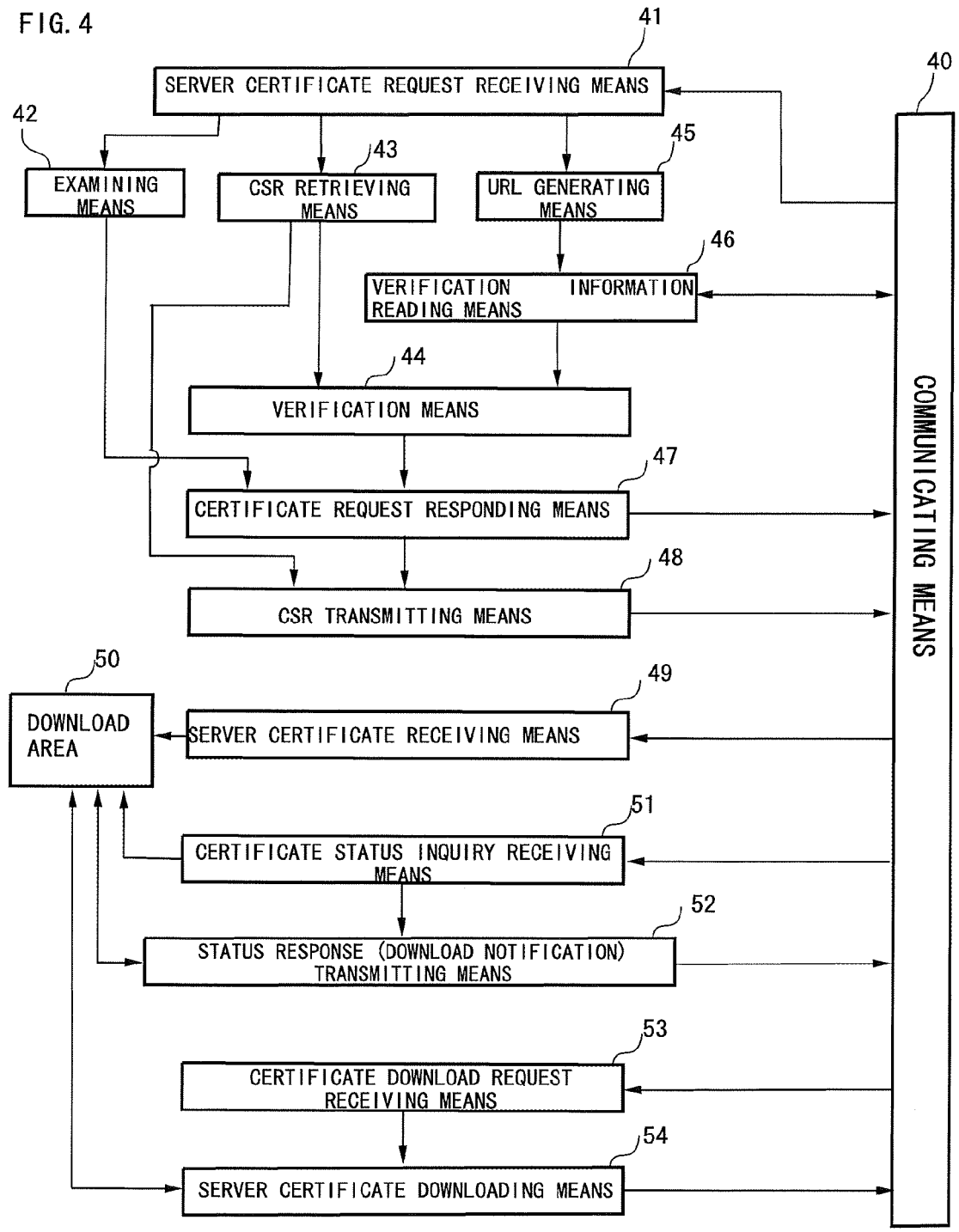
FIG. 4 is a diagram showing an example of a computer system of a registration server.

FIG. 4 is a diagram showing an example of a computer system of the registration server 10 provided in the registration authority. The certificate request transmitted from the Web server is received by certificate request receiving means 41 via communicating means 40. The received certificate request is examined by examining means 42, and a format of the certificate request is checked for checking whether or not predetermined application matters are included. If the predetermined matters are not included therein, the certificate request is processed to be an error. CSR retrieving means 43 operates to retrieve the CSR from the received server certificate request, and transmits the CSR to verification means 44. Moreover, the FQDN is retrieved from the application information and transmitted to URL generating means 45. The URL generating means 45 generates URL information on the verification page formed in the Web server. In the generation of this URL information, the URL of the verification page is generated using the FQDN and a page resource file name (page address information) contained in the application information. The generated URL is transmitted to verification information reading means 46. The verification information reading means 46 accesses the verification page of the Web server identified by the generated URL to read out the verification information indicated thereon, and transmits the verification information to the verification means 44.

The verification means 44 compares the CSR retrieved from the server certificate request with the verification information read from the verification page of the Web server to confirm whether or not they are identical to each other. If they are not identical to each other, the server certificate request is processed to be an error, and the error is transmitted from certificate request responding means 47 to the Web server. On the other hand, if the retrieved CSR is identical to the verification information read from the Web server, the server certificate request is regarded as valid, and an acceptance completion notification is transmitted to the Web server via the certificate request responding means 47. Furthermore, CSR transmitting means 48 operates to transmit the CSR to the certificate issuing server 11.

When receiving the CSR transmitted from the registration server, the certificate issuing server 11 provided in the issuing authority (IA) generates the server certificate with the digital signature and transmits the server certificate to the registration server via the network.

The registration server receives the server certificate transmitted from the certificate issuing server, by server certificate receiving means 49, and stores the server certificate in a download area 50. The registration server has means 51 for receiving the certificate status inquiry transmitted from the Web server. When receiving the status inquiry from the Web server, the status inquiry receiving means 51 confirms whether or not the server certificate is stored in the download area 50, using an order ID as a key. If the server certificate is not stored, noncompletion is notified to the Web server via status response transmitting means 52. If the server certificate is stored, the download notification is transmitted via the status response transmitting means. The download request from the Web server is received by certificate download request receiving means 53. When the download request from the Web server is received, the above described server certificate is downloaded to the Web server by server certificate downloading means 54 via the network.

It should be noted that, if the server certificate is stored in the download area at the time of receiving the status inquiry from the Web server, the server certificate can also be downloaded via the status response transmitting means 52 as a status response.

Figure 5:
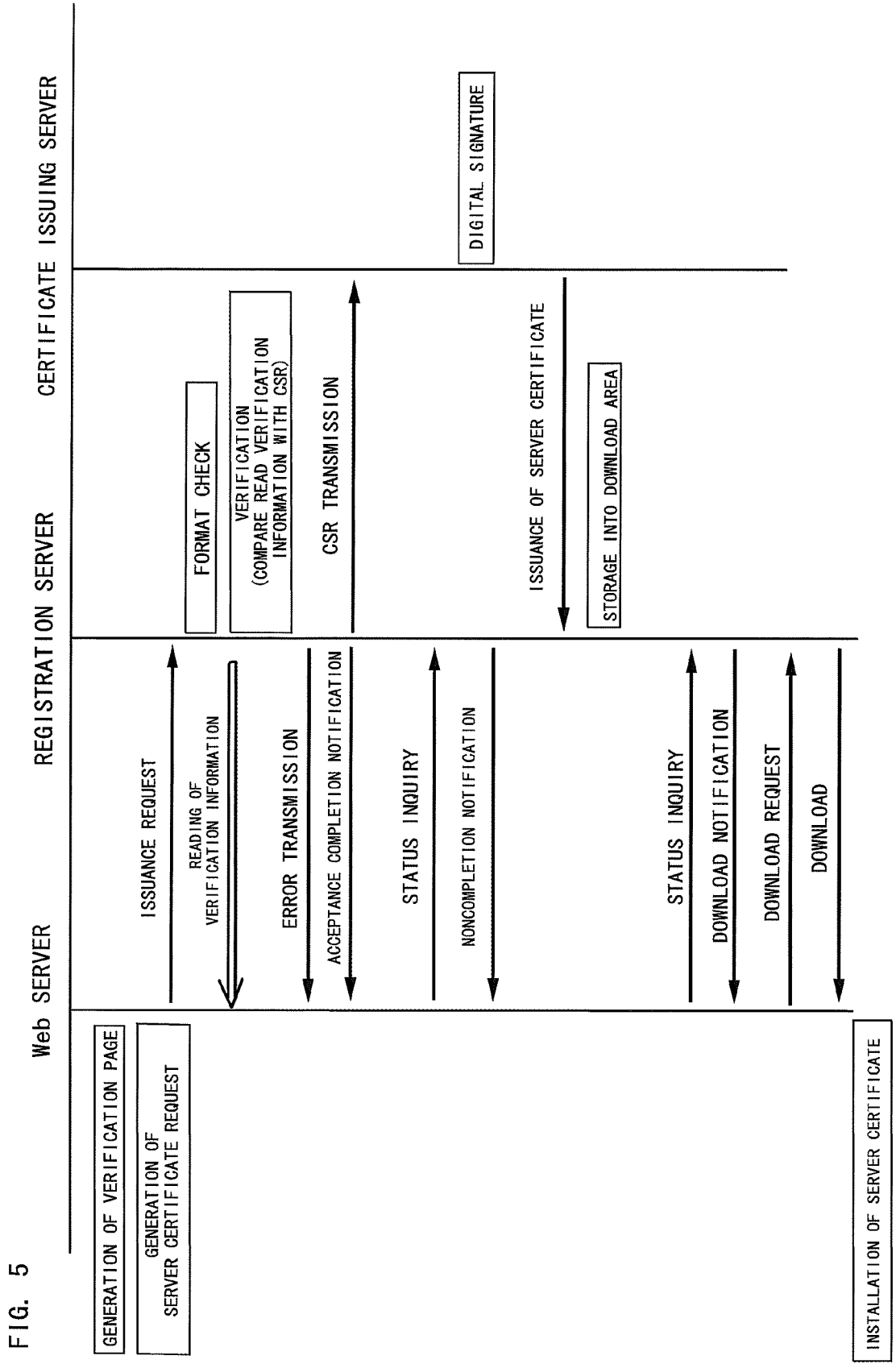
FIG. 5 is a diagram showing a series of operations and processes among the Web server, the registration server and a certificate issuing server.

FIG. 5 is a diagram showing a procedure of the processes from the application for the issuance of the server certificate to the downloading of the server certificate, among the Web server, the registration server and the certificate issuing server. When making the application for the issuance of the server certificate, the administrator of the Web server accesses the Web server managed by him/her to display the entry screen, and inputs the predetermined application matters. Under the control of the control panel, the Web server generates the server certificate request and also generates the key pair, and generates the verification page. Then, the generated CSR is displayed on the verification page. The server certificate request is transmitted to the registration server 10 via the network.

The registration server first checks the format, and if there is an error in the inputted information, the registration server transmits the error. Next, the registration server accesses the verification page of the Web server to read the verification information, and performs the verification by comparing the read verification information with the CSR. As a result of the verification, if the read verification information is not identical to the CSR, the registration server transmits the error. If the read verification information is identical to the CSR, the registration server assigns the order ID to the above described server certificate request, transmits the acceptance completion notification to the Web server, and also transmits the CSR to the certificate issuing server 11.

The certificate issuing server provides the digital signature for the received CSR to generate the server certificate, and transmits the generated server certificate to the registration server. When receiving the server certificate, the registration server stores the received server certificate in the download area.

The registration server receives the status inquiry periodically transmitted from the Web server, and confirms whether or not the server certificate is stored in the download area. If the server certificate is not stored, the registration server transmits the noncompletion notification to the Web server as the response. If the server certificate is stored in the download area, the registration server transmits the download notification as the response to the status inquiry. When receiving the download notification, the Web server transmits the download request to the registration server. In response to the received download request, the registration server downloads the server certificate to the Web server.

Under the control of the control panel, the Web server installs the downloaded server certificate therein. It should be noted that if automation of the downloading and the installation of the issued server certificate is not desired, it is also possible to download and install the issued server certificate with another means after receiving the download notification from the registration server.

In this way, in the server certificate issuing system according to the present invention, the processes up to the installation of the server certificate are automatically executed only by inputting the matters required for the issuance of the server certificate by the administrator of the Web server, and thereby a procedural burden on the administrator is significantly reduced.

Figure 6:
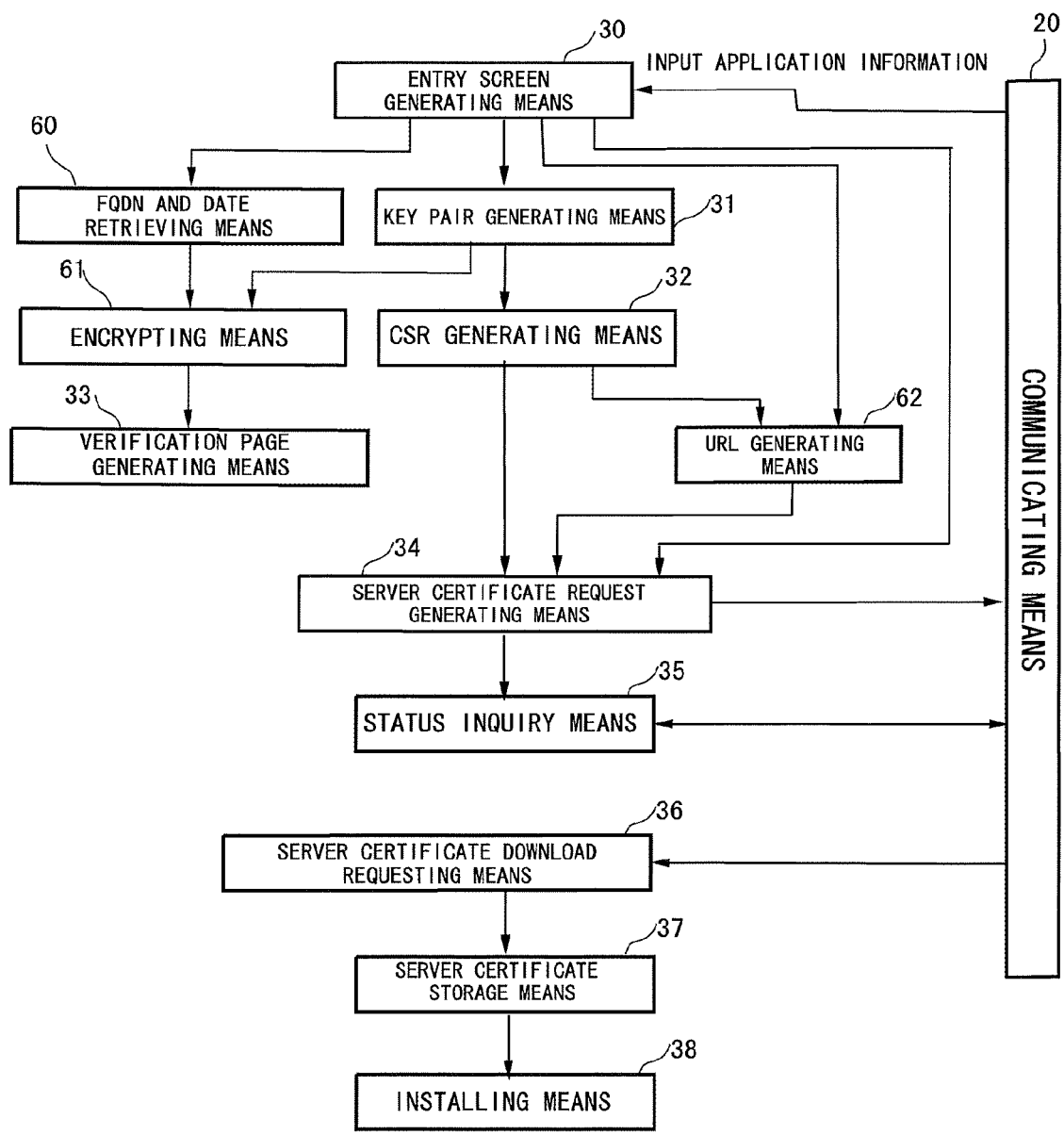
FIG. 6 is a diagram showing a variation of the SSL certificate issuing and managing program incorporated into the Web server.
Figure 7:
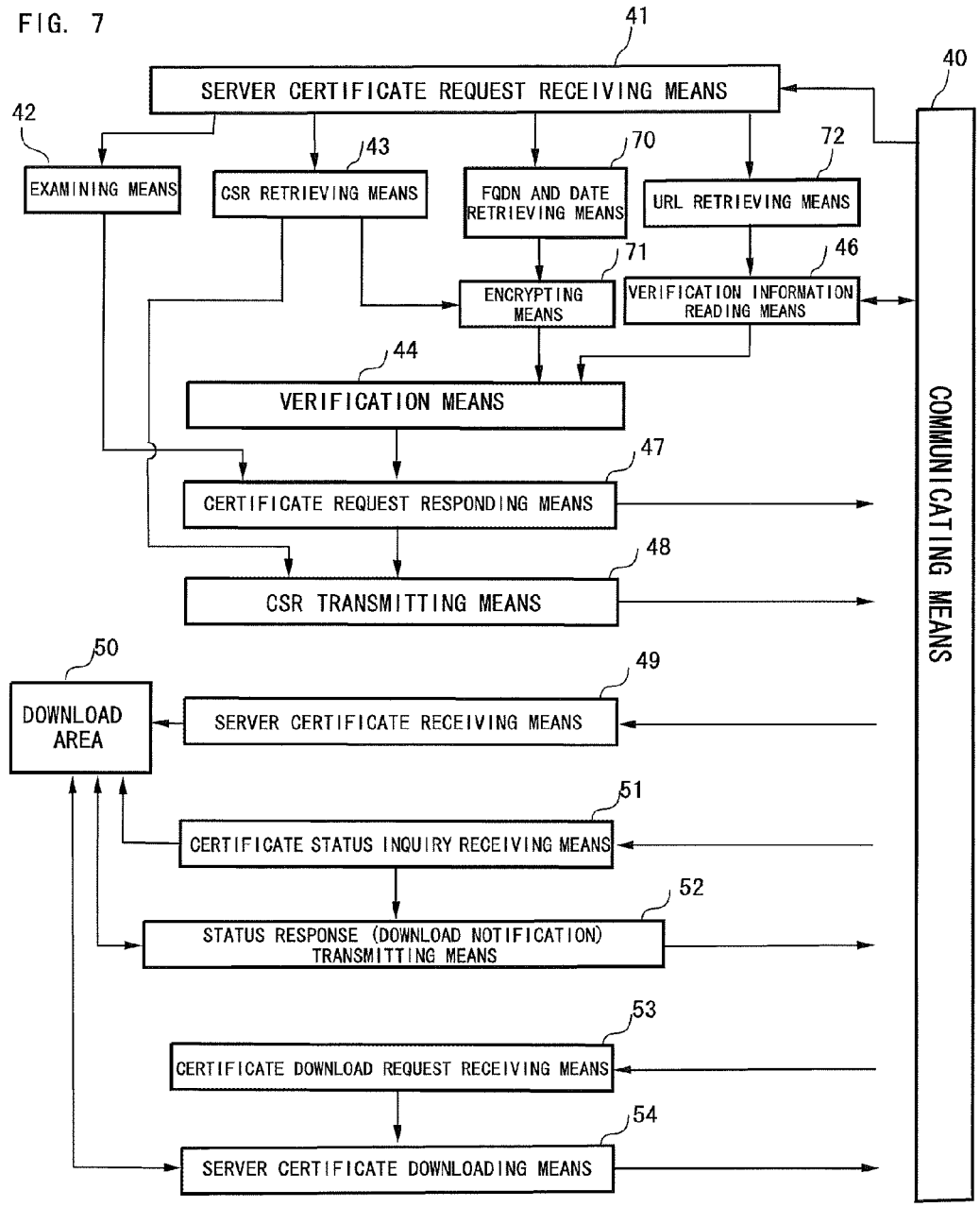
FIG. 7 is a diagram showing a variation of the computer system of the registration server.

FIGS. 6 and 7 show a variation of the server certificate issuing system according to the present invention. FIG. 6 is a diagram showing a computer system of the Web server, and FIG. 7 is a diagram showing the computer system of the registration server. It should be noted that the same reference numeral is assigned to the same component as that used in FIGS. 3 and 4 in the following description. In this example, the verification information is generated by encrypting the FQDN of the Web server and the date using the generated public key, and also the address information on the verification page is generated on the Web server side. Since other configuration is the same as the embodiment shown in FIGS. 3 and 4, a description thereof is omitted.

When the administrator of the Web server accesses the Web server for issuing the certificate, the entry screen generating means 30 is started, and the entry screen to input the application information required for issuing the certificate is displayed on the monitor. When the server administrator has inputted the necessary application information, FQDN and date retrieving means 60 operates to retrieve the FQDN and the date which are uniquely decided from the application information, and transmits the FQDN and the date to encrypting means 61. The public key in the key pair generated by the key pair generating means 31 is transmitted to the encrypting means. The encrypting means uses the generated public key to encrypt the FQDN and the date, and transmits the encrypted FQDN and date to the verification page generating means 33. The verification page generating means 33 displays the encrypted data as the verification information on the verification page.

The FQDN contained in the application information is transmitted to URL generating means 62, and the URL information on the verification page is generated. The URL generating means 62 uses the FQDN and the page resource file name (page address information) contained in the application information to generate the URL of the verification page. The generated URL is transmitted to the server certificate request generating means 34. The server certificate request generating means 34 transmits the server certificate request containing the CSR and the URL of the verification page to the registration server.

With reference to FIG. 7, in the registration server, FQDN and date retrieving means 70 retrieves the FQDN and the date from the server certificate request, and transmits the FQDN and the date to encrypting means 71. Moreover, the CSR is retrieved by the CSR retrieving means 43, and the retrieved public key is transmitted to the encrypting means 71. The encrypting means 71 encrypts the information on the FQDN and the date with the public key, and transmits the encrypted data to the verification means 44. The URL of the verification page contained in the server certificate request is retrieved by URL retrieving means 72, and transmitted to the verification information reading means 46. The verification information reading means 46 accesses the verification page of the Web server identified by the URL contained in the server certificate request to read out the verification information, and transmits the read verification information to the verification means 44. The verification means 44 compares the verification information read from the verification page of the Web server with the encrypted data transmitted from the encrypting means to perform the verification. As a result of the verification, if the encrypted data is identical to the verification information read from the Web server, it is determined that the Web server for which the server certificate is to be issued exists, and subsequent processes are continued. In this way, the security is also assured by using encrypted information other than the CSR as the verification information.

In the case of accessing the Internet, the common name (FQDN) of the server is converted into the IP address, and a telegram is routed to a targeted server. The conversion (mapping) between these common name and IP address is handled by a DNS. Mapping information is strictly managed in a machine referred to as "primary DNS" which manages a domain thereof, and sequentially propagated to many DNS cache servers placed in a distributed manner on the Internet. In the IP address conversion, an inquiry is started with the nearest DNS cache server. Since a DNS which is the basis thereof is managed in an extremely robust manner, the cache servers may become targets of hacker attacks.

In the server certificate issuing system according to the present invention, when the verification page is read according to the URL, it is confirmed that the IP address of the Web server which can be obtained is identical to 1) the IP address obtained by directly inquiring of a DNS managing an appropriate domain registered in WhoisDB, that is, the primary DNS and a secondary DNS, or 2) the IP address obtained by directly inquiring of a DNS managed and operated by a trusted third-party authority. Thereby, a local corruption of the DNS is detected by directly inquiring of the base DNS for which DNS information overwrite attacks targeted at the DNS cache servers are detected, or inquiring of a third major DNS which is strictly managed. Therefore, confirmation that the conversion from the common name to the IP address and the conversion from the IP address to the common name are inextricably linked is also effective in improving the security.

Therefore, the security is dramatically improved by confirming identity between the IP address of the verification page and the IP address of the Web server which has transmitted the application for the issuance of the certificate, and also, for example, confirming identity between the IP address of the verification page at the time of the page verification and a result of directly inquiring of the DNS managing the appropriate domain registered as Whois information and the DNS of the trusted third-party. In other words, the registration server has means for obtaining an IP address corresponding to a domain name of the Web server by directly accessing a primary domain name server (DNS) which manages a database storing a relationship between domain names and the IP addresses, and means for comparing the obtained IP address with the IP address of the verification page, and if these IP addresses are not identical to each other, the above described server certificate request can also be processed to be an error.

It should be noted that storing the IP address/URL name at the time of the verification of the verification page as a log history is remarkably useful for analyzing a cause of omission, along with a log history at the control panel side.

The present invention is not limited to the above described embodiments, and various alterations and variations are possible. In the above described embodiments, although the example of making the certificate request in the Web server lent by the hosting provider has been described, the present invention is applicable to all Web servers. In this case, if a person having an ownership of the Web server makes the application for the issuance of the server certificate, the person can make the application for the issuance of the certificate via his/her own Web server.

Moreover, in the above described embodiments, although the embodiment has been described in which the entry screen generating means, the key pair generating means, the CSR generating means and the verification page generating means are incorporated into the control panel, the present invention is also applied to the case where these means are incorporated into the Web server and not incorporated into the control panel.

Furthermore, in the above described embodiments, although the case where one Web server is managed by one person has been described, the present invention is also applicable to a shared Web server in which one Web server is shared by multiple persons.

Furthermore, in the above described embodiments, the processes from (1) the application for the issuance of the server certificate to (2) the installation of the certificate have been performed under the control of the control panel provided in the Web server. However, it is also possible to directly construct the above described SSL certificate issuing and managing program in the Web server, or also possible to construct the above described SSL certificate issuing and managing program as an additional function in the Web server in a plug-in manner.

What is claimed is:

1. A server certificate issuing system comprising a registration server provided in a registration authority to receive a server certificate request transmitted from a Web server via a network and to transmit a certificate signing request file (CSR) which is included in said server certificate request to an issuing authority after performing a predetermined examination, and a certificate issuing server provided in the issuing authority to receive the CSR transmitted from the registration server, to generate a server certificate with a digital signature, and to transmit the generated server certificate to said registration server, wherein said Web server comprises means for generating an entry screen to input application information, means for generating a key pair of a public key and a private key, means for generating the CSR containing the generated public key, verification page generating means for generating a verification page to indicate intention of requesting an issuance of the server certificate and storing verification information in said verification page, means for generating the server certificate request containing an application information including at least the generated CSR and the address information of said Web server, and means for transmitting the generated server certificate request to the registration server provided in the registration authority, and said registration server comprises means for receiving the server certificate request transmitted from said Web server, verification information reading means for accessing the verification page of the Web server based on the address information contained in the received server certificate request to read out the verification information indicated on the verification page, verification means for comparing the read verification information with the information contained in the server certificate request, and means for transmitting the CSR contained in the received server certificate request to the certificate issuing server, means for receiving the server certificate transmitted from the certificate issuing server, download means for downloading the server certificate to the Web server, and wherein said registration server transmits the CSR contained in said server certificate request to the certificate issuing server only when said verification means has judged that the verification page has been generated, as the result of the verification.

2. The server certificate issuing system according to claim 1, wherein said verification page generating means of said Web server performs an encryption operation for a part of the information contained in the server certificate request using a predetermined encrypting arithmetic expression and displays the obtained encrypted data as the verification information on the verification page, and said verification means of the registration server performs an encryption operation for a part of the information contained in the received server certificate request using said predetermined encrypting arithmetic expression to verify whether the verification page has been generated or not by comparing the generated encrypted data with the verification information read out from the verification page.

3. The server certificate issuing system according to claim 1, wherein an IP address or FQDN of said Web server or URL information of the verification page are used as the address information of the Web server contained in said server certificate request.

4. The server certificate issuing system according to claim 3, wherein said registration server accesses the URL of the verification page contained in the server certificate request to read out the verification information.

5. The server certificate issuing system according to claim 3, wherein said registration server has means for generating the URL of the verification page using the FQDN or the IP address of the Web server and the title of the verification page contained in the server certificate request to access the verification page of the Web server identified by the generated URL in order to read out the verification information.

6. The server certificate issuing system according to claim 1, wherein said Web server has a control panel to mainly configure and manage the Web and email of said Web server, and wherein the means for generating the entry screen to input the application information, the means for generating the key pair, the means for generating the CSR, the means for generating the verification page, and the means for generating the server certificate request are loaded on said control panel.

7. The server certificate issuing system according to claim 1, wherein said Web server has status inquiry means for inquiring of the registration server as to the issuance status of the certificate, and performs the status inquiry periodically using an assigned application ID as a key.

8. The server certificate issuing system according to claim 7, wherein said registration server further comprises means for storing the received server certificate in a download area, means for responding to the status inquiry transmitted from said Web server, and and when said registration server receives the status inquiry from the Web server, said registration server confirms whether a corresponding server certificate is stored in the download area or not, and if the server certificate is stored, as a response to said status inquiry, the server certificate stored in the download area is downloaded to the Web server, and wherein the processes from the application for issuance of the server certificate to the downloading of the issued server certificate to the Web server are automatically executed in series.

9. The server certificate issuing system according to claim 1, wherein an administrator of the Web server accesses the Web server managed by him/her via a terminal and a network, calls the entry screen to input the application information of the server certificate and inputs required application details into the entry screen.

10. The server certificate issuing system according to claim 1, wherein said registration server further comprises means for obtaining an IP address corresponding to a domain name of said Web server by directly accessing a primary domain name server (DNS) which manages a database storing a relationship between the domain names and the IP addresses, and means for comparing the obtained IP address with an IP address of the verification page, wherein if both the IP addresses are not identical to each other, the server certificate request is processed to be an error.

11. A server certificate issuing system comprising a registration server provided in a registration authority to receive a server certificate request transmitted from a Web server via a network and to transmit a certificate signing request file (CSR) which is included in said server certificate request to an issuing authority after performing a predetermined examination, and a certificate issuing server provided in the issuing authority to receive the CSR transmitted from the registration server, to generate a server certificate with a digital signature, and to transmit the generated server certificate to said registration server, wherein said Web server comprises means for generating an entry screen to input application information, means for generating a key pair of a public key and a private key, means for generating the CSR containing the generated public key, verification page generating means for generating a verification page to indicate intention of requesting an issuance of the server certificate and storing verification information in said verification page, means for generating the server certificate request containing an application information including at least the generated CSR and the address information of said Web server, and means for transmitting the generated server certificate request to the registration server provided in the registration authority, and said registration server comprises means for receiving the server certificate request transmitted from said Web server, verification information reading means for accessing the verification page of the Web server based on the address information contained in the received server certificate request to read out the verification information indicated on the verification page, verification means for comparing the read verification information with the information contained in the server certificate request, and means for transmitting the CSR contained in the received server certificate request to the certificate issuing server, means for receiving the server certificate transmitted from the certificate issuing server, download means for downloading the server certificate to the Web server, and wherein said registration server transmits the CSR contained in said server certificate request to the certificate issuing server only when said verification means has judged that the verification page has been generated, as the result of the verification; wherein the CSR contained in server certificate request is used as said verification information, the verification page generating means of said Web server displays the generated CSR on the verification page, and said verification means of the registration server verifies whether the verification page has been generated or not by comparing the verification information read out from the verification page with the CSR contained in the server certificate request.

12. A server certificate issuing system comprising a registration server provided in a registration authority to receive a server certificate request transmitted from a Web server via a network and to transmit a certificate signing request file (CSR) which is included in said server certificate request to an issuing authority after performing a predetermined examination, and a certificate issuing server provided in the issuing authority to receive the CSR transmitted from the registration server, to generate a server certificate with a digital signature, and to transmit the generated server certificate to said registration server, wherein said Web server comprises means for generating an entry screen to input application information, means for generating a key pair of a public key and a private key, means for generating the CSR containing the generated public key, verification page generating means for generating a verification page to indicate intention of requesting an issuance of the server certificate and storing verification information in said verification page, means for generating the server certificate request containing an application information including at least the generated CSR and the address information of said Web server, and means for transmitting the generated server certificate request to the registration server provided in the registration authority, and said registration server comprises means for receiving the server certificate request transmitted from said Web server, verification information reading means for accessing the verification page of the Web server based on the address information contained in the received server certificate request to read out the verification information indicated on the verification page, verification means for comparing the read verification information with the information contained in the server certificate request, and means for transmitting the CSR contained in the received server certificate request to the certificate issuing server, means for receiving the server certificate transmitted from the certificate issuing server, download means for downloading the server certificate to the Web server, and wherein said registration server transmits the CSR contained in said server certificate request to the certificate issuing server only when said verification means has judged that the verification page has been generated, as the result of the verification wherein said verification page generating means of said Web server performs an encryption operation for a part of the information contained in the server certificate request using a predetermined encrypting arithmetic expression and displays the obtained encrypted data as the verification information on the verification page, and said verification means of the registration server performs an encryption operation for a part of the information contained in the received server certificate request using said predetermined encrypting arithmetic expression to verify whether the verification page has been generated or not by comparing the generated encrypted data with the verification information read out from the verification page; wherein the verification page generating means of the Web server performs an encryption operation using the public key of the generated key pair, and displays the generated encrypted data as the verification information on the verification page, and said verification means of the registration server performs an encryption operation using the public key contained in the CSR, and compares the generated encrypted data with the verification information read out from the verification page.

* * * * *

UNITED STATES PATENT AND TRADEMARK OFFICE
CERTIFICATE OF CORRECTION

PATENT NO. : 7,673,331 B2
APPLICATION NO. : 12/187973
DATED : March 2, 2010
INVENTOR(S) : Kido et al.

It is certified that error appears in the above-identified patent and that said Letters Patent is hereby corrected as shown below:

Title page:
    In item (73), "Assignee", change "Globalsign K.K." to --GlobalSign K.K.--.
    After "*Primary Examiner—*", change "William R Korzuch" to --William R. Korzuch--.
    After "*Assistant Examiner—*", change "Michael R Vaughan" to --Michael R. Vaughan--.
    In item (57), the "ABSTRACT", 2nd line, change "The web" to --The Web--;
        5th line, change "key pair a" to --key pair of a--.

Column 1:
    Line 39, change "above described" to --above-described--.

Column 2:
    Line 36, change "in the above" to --in the above- --.
    Line 39, change "above described" to --above-described--.

Column 3:
    Line 41, line 42, line 61, and lines 64-65, change "above described" to
--above-described--.

Column 4:
    Lines 2-3 and lines 44-45, change "above described" to --above-described--.
    Line 56, change "Web and a mail" to --Web and e-mail--.
    Line 57, change "above described" to --above-described--.

Column 5:
    Line 18, lines 20-21, and line 24, change "above described" to --above-described--.
    Line 38, change "tion sever" to --tion server--.

Column 6:
    Line 15 and line 18, change "servers 1 to n" to --servers 1 to n--.
    Line 20, change "terminals 1 to n" to --terminals 1 to n--.
    Lines 21-22, change "respective Web servers, respectively." to --respective Web
servers.--.

Signed and Sealed this

Seventh Day of September, 2010

David J. Kappos
*Director of the United States Patent and Trademark Office*

Line 24, change "above described" to --above-described--.
Line 39, change "the Web server 1" to --Web server 1--.
Line 40, change "above described" to --above-described--.
Lines 40-41, change "the Web server 1" to --the Web server 1--.
Line 41, change "the terminal 1" to --terminal 1--.

Column 7:
 Line 1 and line 3, change "the Web server 1" to --Web server 1--.
 Line 26, change "applications 1 to 3" to --applications 1 to 3--.

Column 9:
 Line 2 and line 34, change "above described" to --above-described--.

Column 10:
 Lines 14-15, change "Since other configuration is" to --Since other configurations are--.

Column 11:
 Line 40, change "third-party" to --third party--.
 Line 47, line 53, line 55, and line 63, change "above described" to --above-described--.

Column 12:
 Line 4, line 9, line 14, and line 16, change "above described" to --above-described--.

Column 13:
 Line 39, change "Web and email" to --Web and e-mail--.
 Line 59, change "server, and and" to --server, and--.

Column 14:
 Line 9, change "certificate and inputs" to --certificate, and inputs--.